United States Patent
Sinha et al.

(10) Patent No.: US 9,003,440 B2
(45) Date of Patent: *Apr. 7, 2015

(54) METHOD AND SYSTEM FOR SYNCHRONIZATION OF MESSAGES TO CONTENT UTILIZING AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/730,644

(22) Filed: Dec. 28, 2012

(65) Prior Publication Data

US 2013/0205338 A1     Aug. 8, 2013

Related U.S. Application Data

(60) Provisional application No. 61/596,012, filed on Feb. 7, 2012.

(51) Int. Cl.
*H04N 7/10*     (2006.01)
*H04N 7/025*    (2006.01)
(Continued)

(52) U.S. Cl.
CPC ........ *H04N 21/44008* (2013.01); *G06T 1/0021* (2013.01); *G06F 17/30495* (2013.01);
(Continued)

(58) Field of Classification Search
CPC .............. H04N 21/442; H04N 21/435; H04N 21/42209; H04N 21/454; H04N 21/47214; H04N 21/4882
USPC ...................................... 725/32–36
See application file for complete search history.

(56) References Cited

U.S. PATENT DOCUMENTS

| | | |
|---|---|---|
| 5,410,326 A | 4/1995 | Goldstein |
| 5,437,050 A | 7/1995 | Lamb et al. |

(Continued)

FOREIGN PATENT DOCUMENTS

| | | |
|---|---|---|
| EP | 1485815 | 10/2007 |
| EP | 1354276 | 12/2007 |

(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Randy Flynn
(74) *Attorney, Agent, or Firm* — Arent Fox LLP

(57) ABSTRACT

An automatic content recognition (ACR) enabled (ACR-enabled) connected TV device may be operable to present, utilizing ACR, an overlay starting at a time that is synchronized to an identified event in presented content. The overlay may comprise one or more messages associated with an online social network. The presented content may comprise a program, a movie, a game or a commercial. The one or more messages may be pre-generated, before presentation of the content, for presentation synchronized to the identified event during the presentation of the content. The one or more messages may be generate during broadcast or streaming of a program or a movie, and the presented content, which comprises the program or the movie, may be presented during a time-delayed playback. The ACR-enabled connected TV device may track, utilizing the ACR, how each of the presented one or more messages is actually being viewed and/or interacted with.

20 Claims, 11 Drawing Sheets

(51) Int. Cl.

| | | |
|---|---|---|
| H04H 60/32 | (2008.01) | |
| H04N 21/44 | (2011.01) | |
| G06T 1/00 | (2006.01) | |
| G06F 17/30 | (2006.01) | |
| G06F 3/0484 | (2013.01) | |
| H04N 21/442 | (2011.01) | |
| H04N 21/4784 | (2011.01) | |
| H04N 21/4722 | (2011.01) | |
| H04N 21/478 | (2011.01) | |
| H04N 21/441 | (2011.01) | |
| H04N 21/81 | (2011.01) | |
| H04N 21/435 | (2011.01) | |
| H04N 21/00 | (2011.01) | |

(52) U.S. Cl.
CPC ............ *G06F3/0484* (2013.01); *H04N 21/442* (2013.01); *H04N 21/4784* (2013.01); *H04N 21/4722* (2013.01); *H04N 21/478* (2013.01); *H04N 21/441* (2013.01); *H04N 21/812* (2013.01); *H04N 21/435* (2013.01); *H04N 21/00* (2013.01)

(56) References Cited

U.S. PATENT DOCUMENTS

| | | |
|---|---|---|
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,184,877 B1 | 2/2001 | Dodson et al. |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Negishi et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,134,132 B1 | 11/2006 | Ngo |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,624,416 B1 * | 11/2009 | Vandermolen et al. ......... 725/13 |
| 7,707,088 B2 | 4/2010 | Schmelzer |
| 7,711,652 B2 | 5/2010 | Schmelzer |
| 7,730,509 B2 | 6/2010 | Boulet et al. |
| 7,783,489 B2 | 8/2010 | Kenyon et al. |
| 7,797,249 B2 | 9/2010 | Schmelzer et al. |
| 7,813,954 B1 | 10/2010 | Price |
| 7,870,574 B2 | 1/2011 | Kenyon et al. |
| 7,877,438 B2 | 1/2011 | Schrempp et al. |
| 7,917,645 B2 | 3/2011 | Ikezoye et al. |
| 8,006,274 B2 | 8/2011 | Scott, III |
| 8,249,422 B2 | 8/2012 | Narahara et al. |
| 8,335,833 B1 * | 12/2012 | Parkinson ....................... 725/32 |
| 8,407,750 B2 * | 3/2013 | Vorbau ......................... 725/109 |
| 8,418,206 B2 | 4/2013 | Bryant et al. |
| 8,553,148 B2 | 10/2013 | Ramaswamy et al. |
| 2002/0069100 A1 | 6/2002 | Arberman |
| 2002/0073419 A1 | 6/2002 | Yen |
| 2002/0078441 A1 * | 6/2002 | Drake et al. ...................... 725/9 |
| 2002/0083060 A1 | 6/2002 | Wang et al. |
| 2002/0120925 A1 * | 8/2002 | Logan ............................... 725/9 |
| 2002/0178447 A1 | 11/2002 | Plotnick |
| 2003/0035075 A1 | 2/2003 | Butler et al. |
| 2003/0055699 A1 | 3/2003 | O'Connor |
| 2003/0101451 A1 | 5/2003 | Bentolila |
| 2003/0149975 A1 | 8/2003 | Eldering |
| 2003/0154475 A1 | 8/2003 | Rodriguez |
| 2003/0172381 A1 | 9/2003 | Janevski |
| 2004/0003397 A1 | 1/2004 | Boston et al. |
| 2004/0034874 A1 | 2/2004 | Hord |
| 2004/0068737 A1 | 4/2004 | Itoh et al. |
| 2004/0143349 A1 | 7/2004 | Roberts |
| 2005/0097599 A1 | 5/2005 | Plotnick et al. |
| 2005/0235307 A1 | 10/2005 | Relan |
| 2005/0278731 A1 | 12/2005 | Cameron |
| 2006/0015923 A1 * | 1/2006 | Chuah et al. .................. 725/135 |
| 2006/0026636 A1 | 2/2006 | Stark et al. |
| 2006/0031684 A1 | 2/2006 | Sharma et al. |
| 2006/0187358 A1 | 8/2006 | Lienhart |
| 2006/0195860 A1 | 8/2006 | Eldering |
| 2006/0282847 A1 * | 12/2006 | Gupte ............................ 725/25 |
| 2007/0192784 A1 | 8/2007 | Postrel |
| 2007/0250901 A1 * | 10/2007 | McIntire et al. .............. 725/146 |
| 2008/0104634 A1 | 5/2008 | Gajdos et al. |
| 2008/0305815 A1 | 12/2008 | McDonough |
| 2008/0310731 A1 | 12/2008 | Stojancic et al. |
| 2008/0313140 A1 | 12/2008 | Pereira et al. |
| 2009/0064261 A1 | 3/2009 | Jung |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0235317 A1 | 9/2009 | Igarashi |
| 2009/0317053 A1 | 12/2009 | Morley |
| 2009/0318114 A1 | 12/2009 | Bertoni |
| 2010/0007797 A1 | 1/2010 | Stojancic |
| 2010/0043040 A1 * | 2/2010 | Olsen, Jr. ..................... 725/110 |
| 2010/0095337 A1 | 4/2010 | Dua |
| 2010/0121691 A1 | 5/2010 | Shifflett et al. |
| 2010/0158391 A1 | 6/2010 | Cunningham |
| 2010/0162344 A1 | 6/2010 | Casagrande et al. |
| 2010/0169906 A1 * | 7/2010 | Takahashi ....................... 725/13 |
| 2010/0175078 A1 | 7/2010 | Knudson |
| 2010/0205628 A1 | 8/2010 | Davis et al. |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2011/0067046 A1 | 3/2011 | Cox et al. |
| 2011/0067066 A1 * | 3/2011 | Barton et al. ................... 725/46 |
| 2011/0078729 A1 | 3/2011 | Lajoie et al. |
| 2011/0088063 A1 | 4/2011 | Ben-Romdhane et al. |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0283322 A1 | 11/2011 | Hamano |
| 2011/0283327 A1 | 11/2011 | Zhu |
| 2011/0289114 A1 | 11/2011 | Yu et al. |
| 2011/0289524 A1 | 11/2011 | Toner |
| 2011/0311095 A1 | 12/2011 | Archer |
| 2011/0313856 A1 | 12/2011 | Cohen et al. |
| 2011/0314495 A1 | 12/2011 | Zenor |
| 2012/0017236 A1 | 1/2012 | Stafford et al. |
| 2012/0042334 A1 * | 2/2012 | Choi et al. ....................... 725/32 |
| 2012/0096491 A1 | 4/2012 | Shkedi |
| 2012/0117584 A1 | 5/2012 | Gordon |
| 2012/0124625 A1 * | 5/2012 | Foote et al. ..................... 725/42 |
| 2012/0167133 A1 * | 6/2012 | Carroll et al. ................... 725/32 |
| 2012/0174157 A1 * | 7/2012 | Stinson et al. .................. 725/40 |
| 2012/0185895 A1 | 7/2012 | Wong et al. |
| 2012/0192227 A1 * | 7/2012 | Fleischman et al. ............ 725/34 |
| 2012/0215789 A1 | 8/2012 | Ramanathan |
| 2012/0246693 A1 | 9/2012 | Iqbal |
| 2012/0311618 A1 * | 12/2012 | Blaxland ........................... 725/9 |
| 2012/0317240 A1 | 12/2012 | Wang |
| 2012/0331496 A1 * | 12/2012 | Copertino et al. .............. 725/14 |
| 2013/0019262 A1 | 1/2013 | Bhatia et al. |
| 2013/0047178 A1 | 2/2013 | Moon |
| 2013/0125163 A1 | 5/2013 | Chen et al. |

(56) References Cited

U.S. PATENT DOCUMENTS

| | | | |
|---|---|---|---|
| 2013/0132999 | A1 | 5/2013 | Pandey |
| 2013/0162902 | A1 | 6/2013 | Musser |
| 2013/0163957 | A1 | 6/2013 | Ikizyan |
| 2013/0198768 | A1 | 8/2013 | Kitazato |
| 2013/0208942 | A1 | 8/2013 | Davis |
| 2013/0305335 | A1 | 11/2013 | Syed et al. |
| 2013/0332951 | A1 | 12/2013 | Gharaat |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al., "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

\* cited by examiner

METHOD AND SYSTEM FOR SYNCHRONIZATION OF MESSAGES TO CONTENT UTILIZING AUTOMATIC CONTENT RECOGNITION

CROSS-REFERENCE TO RELATED APPLICATIONS/INCORPORATION BY REFERENCE

This patent application makes reference to, claims priority to, and claims benefit from U.S. Provisional Application Ser. No. 61/596,012, which was filed on Feb. 7, 2012.

This application makes reference to:
U.S. patent application Ser. No. 13/730,359 filed on Dec. 28, 2012;
U.S. patent application Ser. No. 13/730,422 filed on Dec. 28, 2012;
U.S. patent application Ser. No. 13/730,459 filed on Dec. 28, 2012;
U.S. patent application Ser. No. 13/730,495 filed on Dec. 28, 2012;
U.S. patent application Ser. No. 13/730,530 filed on Dec. 28, 2012;
U.S. patent application Ser. No. 13/730,754 filed on Dec. 28, 2012;
U.S. patent application Ser. No. 13/730,559 filed on Dec. 28, 2012; and
U.S. patent application Ser. No. 13/730,579 filed on Dec. 28, 2012;
U.S. patent application Ser. No. 13/730,593 filed on Dec. 28, 2012;
U.S. patent application Ser. No. 13/730,759 filed on Dec. 28, 2012;
U.S. patent application Ser. No. 13/730,627 filed on Dec. 28, 2012;
U.S. patent application Ser. No. 13/730,656 filed on Dec. 28, 2012;
U.S. patent application Ser. No. 13/730,670 filed on Dec. 28, 2012;
U.S. patent application Ser. No. 13/730,691 filed on Dec. 28, 2012;
U.S. patent application Ser. No. 13/730,702 filed on Dec. 28, 2012; and
U.S. patent application Ser. No. 13/730,718 filed on Dec. 28, 2012; and
U.S. patent application Ser. No. 13/730,734 filed on Dec. 28, 2012.

Each of the above stated applications is hereby incorporated herein by reference in its entirety.

FIELD OF THE INVENTION

Certain embodiments of the invention relate to content recognition. More specifically, certain embodiments of the invention relate to a method and system for synchronization of messages to content utilizing automatic content recognition.

BACKGROUND OF THE INVENTION

Smart or connected televisions (TVs) may receive data from data networks such as Internet networks that allow a viewer to not only access broadcast digital content, but also receive multimedia content. With the proliferation of connected TVs and wireless communication devices such as smartphones and tablets, content or network providers now have a plethora of avenues for distributing media including programming, advertisements and interactive content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for synchronization of messages to content utilizing automatic content recognition, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for synchronization of messages to content utilizing automatic content recognition. In various embodiments of the invention, an automatic content recognition (ACR) enabled (ACR-enabled) connected TV device may be operable to present, utilizing ACR, an overlay starting at a time synchronized to an identified event in presented content, and the overlay may comprise one or more messages associated with an online social network. In instances when the ACR-enabled connected TV device is paired with or associated with a paired device utilizing a companion application running on the paired device, the overlay may also be presented on the paired device. In this regard, the presented content may comprise, for example, a program, a movie, a game or a commercial associated with a network.

In some exemplary embodiments of the invention, the one or more messages may be pre-generated and prerecorded, before presentation of the content, for presentation synchronized to the identified event during the presentation of the content. In instances when the one or more messages are being presented, the ACR-enabled connected TV device may be operable to present, utilizing the ACR, for example one or more additional messages associated with the online social network in the presented overlay, and the one or more additional messages are generated during the presentation of the content. The one or more messages may be generated, for example, during broadcast or streaming of a program or a movie, and the presented content, which comprises the program or the movie, may be presented during a time-delayed playback such as, for example, a digital video recorder (DVR) playback.

In an exemplary embodiment of the invention, the presented content may comprise, for example, a program or a movie and the one or more messages may be generated by a person associated with the program or the movie. In such instances, the ACR-enabled connected TV device may be operable to present, utilizing the ACR, another overlay during presentation of an identified advertisement in a commercial break, where the another overlay may comprise one or more other messages associated with the online social network, and the one or more other messages may also be generated by the same person.

In an exemplary embodiment of the invention, the ACR-enabled connected TV device may be operable to track, utilizing the ACR, how each of the presented one or more messages is actually being viewed and/or interacted with. In another exemplary embodiment of the invention, when an outgoing message associated with the online social network is generated and displayed during presentation of the content, the ACR-enabled connected TV device may be operable to identify, utilizing the ACR, a particular event in the presented content, and the particular event may occur at a time that may be synchronized to a beginning of the presentation of the outgoing message.

Figure 1A:
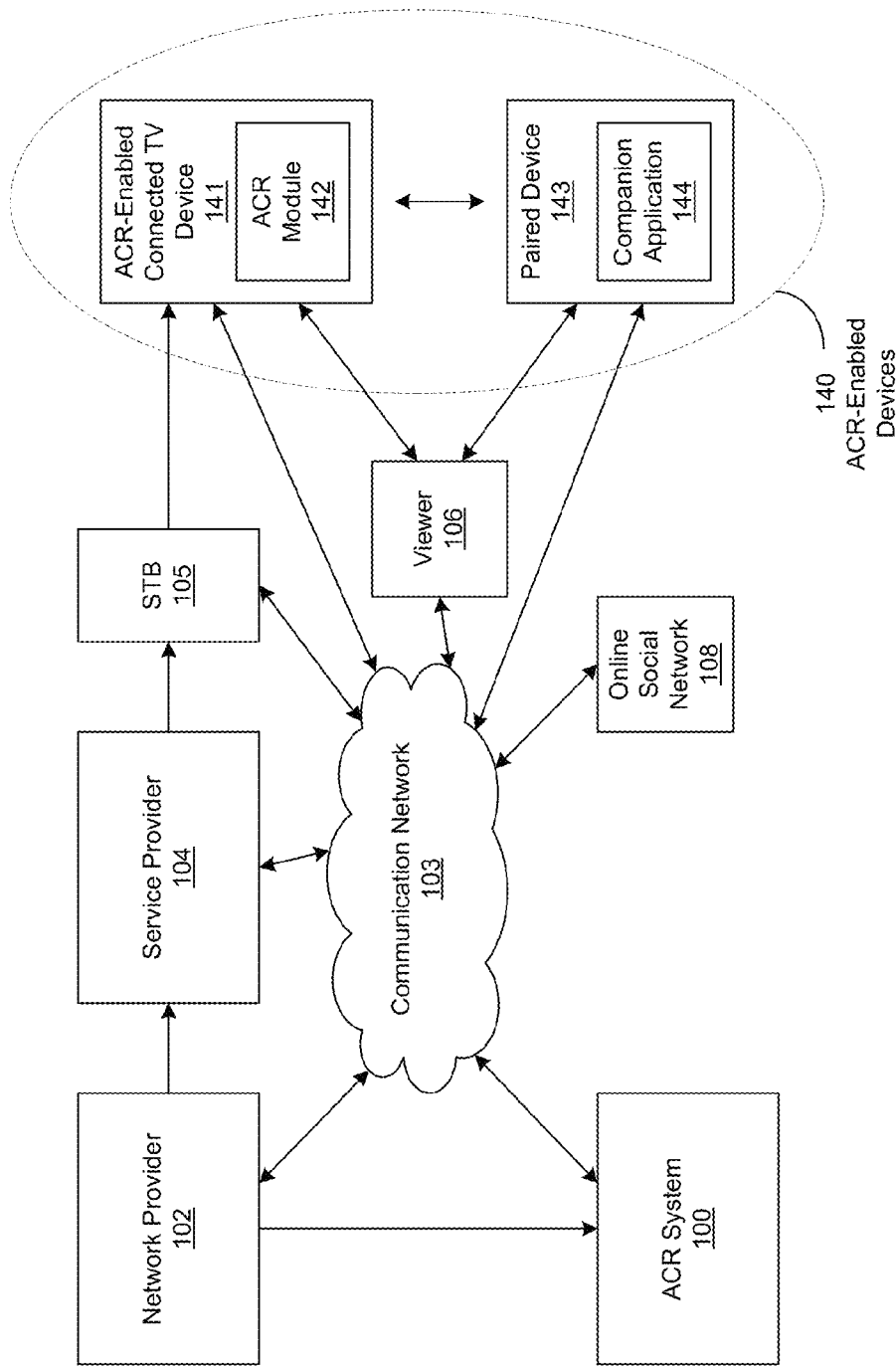
FIG. 1A is a block diagram illustrating an exemplary communication system, in accordance with an embodiment of the invention.

FIG. 1A is a block diagram illustrating an exemplary communication system, in accordance with an embodiment of the invention. Referring to FIG. 1A, there is shown an ACR system 100, a network provider 102, a communication network 103, a service provider 104, a set-top box (STB) 105, a viewer 106, an online social network 108 and ACR-enabled devices 140. The ACR-enabled devices 140 may comprise an ACR-enabled connected TV device 141 and a paired device 143. The ACR-enabled connected TV device 141 may comprise an ACR module 142. The paired device 143 may comprise a companion application 144.

The ACR system 100 may comprise suitable logic, circuitry, interfaces and/or code that may be operable to support automatic content recognition operations in the ACR-enabled devices 140 such as the ACR-enabled connected TV device 141. The ACR system 100 may provide automatic content recognition applications and/or services to the ACR-enabled devices 140. The ACR system 100 may support a plurality of automatic content recognition technologies and may provide appropriate synchronization to the ACR-enabled connected TV device 141 and/or to the corresponding paired device 143. For example, the ACR system 100 may implement an abstraction layer to support a plurality of different fingerprinting technologies for the automatic content recognition. In this regard, the ACR system 100 may utilize fingerprints to identify content. More details of the operation of the ACR system 100 are described below with respect to, for example, FIGS. 1B, 2A-2C.

In an exemplary embodiment of the invention, the ACR system 100 may be utilized to synchronize message(s) associated with an online social network, such as the online social network 108, to an identified event in presented content.

The network provider 102 may comprise suitable logic, circuitry, interfaces and/or code that may be operable to generate, capture and/or package content such as TV programming or multimedia content that may be distributed to display devices such as the ACR-enabled devices 140. For example, the content may be distributed to the ACR-enabled connected TV device 141 via the service provider 104 and the STB 105 or via the communication network 103. In an exemplary embodiment of the invention, the network provider 102 may provide content to the ACR system 100 for supporting the automatic content recognition operation.

The communication network 103 may comprise suitable logic, circuitry, interfaces and/or code that may be operable to provide communication among a plurality of entities via various wire-line and/or wireless technologies such as, for example, T1/E1, DSL, cable modem, FTTx, PLC and/or WiMAX. The communication network 103 may comprise, for example, Internet and/or another multimedia network.

The service provider 104 may comprise suitable logic, circuitry, interfaces and/or code that may be operable to provide services using different access technologies to display devices such as the ACR-enabled devices 140. For example, the service provider 104 may provide connections to the ACR-enabled connected TV device 141 via the STB 105. Such connections may be utilized by the ACR-enabled connected TV device 141 to access content provided by the network provider 102.

The STB 105 may comprise suitable logic, circuitry, interfaces and/or code that may be operable to connect a display device such as the ACR-enabled connected TV device 141 to an external source of signals, such as the service provider 104, and to convert those signals into content that may be displayed on the screen of the ACR-enabled connected TV device 141. The STB 105 may be operable to provide processing associated with managing, delivering, and/or storing video content that may be displayed on the ACR-enabled connected TV device 141.

The ACR-enabled connected TV device 141 may comprise suitable logic, circuitry, interfaces and/or code that may be operable to receive content for presenting to a viewer such as the viewer 106. The content may comprise interactive content for the viewer 106 to interact. In addition to receiving content via the service provider 104 and the STB 105, the ACR-enabled connected TV device 141 may receive content from Internet via the communication network 103. In an exemplary embodiment of the invention, the ACR-enabled connected TV device 141 may comprise an ACR module 142. The ACR module 142 may comprise suitable logic, circuitry, interfaces and/or code that may be operable to provide automatic content recognition functions for the ACR-enabled connected TV device 141. The ACR module 142 may communicate with the ACR system 100 and/or with the corresponding ACR vendor's matching service, via the communication network 103, to support the automatic content recognition operations of the ACR-enabled connected TV device 141. For example and without loss of generality, the ACR module 142 may support the automatic content recognition operations on video content provided by the network provider 102 via the service provider 104, or on video content being played back from a digital video recorder (DVR) or similar device. The invention is not limited to ACR for video. Accordingly, the various aspects of the invention that are described with respect to video may be equally applicable to audio.

The ACR module 142 may, for example, provide fingerprints to a vendor ACR system for matching. U.S. patent application Ser. No. 13/730,422 filed on Dec. 28, 2012 discloses an exemplary vendor ACR cloud/matching service or system. The ACR module 142 may receive ACR related information or content from the ACR system 100, for example. The ACR module 142 may be operable to run or execute a synchronous event manager to monitor events that occur internally to the ACR-enabled connected TV device 141 and/or events from sources external to the ACR-enabled connected TV device 141. The synchronous event manager may be run as a background process that may be transparent to the user. The synchronous event manager may be executed continuously during those periods where monitoring is to take place. An example of events from external sources may include, but need not necessarily be limited to, an overlay event corresponding to an automatic content recognition match. Examples of internal events may include, but need not be necessarily limited to, a process, an application, and/or a function corresponding to the automatic content recognition performed by the ACR-enabled connected TV device 141. In response to detected event triggers, the synchronous event manager may request and receive applications, such as user-interaction applications, which may be executed to produce interactive opportunities that may be presented to a viewer such as the viewer 106, for example. The synchronous event manager may be implemented, for example, in software, firmware and/or hardware.

In an exemplary embodiment of the invention, the ACR module 142 may be operable to present messages associated with an online social network such as the online social network 108 via, for example, an overlay. The ACR module 142 may be operable to present, based on communication with, for example the ACR system 100, an overlay starting at a time synchronized to an identified event in presented content, and the overlay may comprise one or more messages associated with the online social network 108. In this regard, the presented content may comprise, for example, a program, a movie, a game or a commercial associated with a network provided by a network provider such as the network provider 102. In instances when the one or more messages are being presented, the ACR module 142 may be operable to present, based on communication with the ACR system 100, for example, one or more additional messages associated with the online social network 108 in the presented overlay. The one or more additional messages are generated during the presentation of the content.

In an exemplary embodiment of the invention, the presented content may comprise, for example, a program or a movie and the one or more messages may be generated by a person associated with the program or the movie. In such instances, the ACR module 142 may be operable to present, based on communication with the ACR system 100, another overlay during presentation of an identified advertisement during a commercial break. The overlay may comprise one or more other messages associated with the online social network 108, and the one or more other messages may also be generated by the same person.

In another exemplary embodiment of the invention, the ACR module 142 may be operable to track, based on communication with the ACR system 100, how each of the presented one or more messages is actually being viewed and/or interacted with. In another exemplary embodiment of the invention, when an outgoing message associated with the online social network 108 is generated and displayed during presentation of the content, the ACR module 142 may be operable to identify, based on communication with the ACR system 100, a particular event in the presented content, where the particular event may occur at a time synchronized to a beginning of the presentation of the outgoing message.

The paired device 143 may comprise suitable logic, circuitry, interfaces and/or code that may be operable to pair with the ACR-enabled connected TV device 141 for automatic content recognition operations, including but not limited to second screen operations. Communication between the ACR-enabled connected TV device 141 and the paired device 143 may occur via a wireless communication protocol such as, for example, near field communication (NFC). The paired device 143 may pair with the ACR-enabled connected TV device 141 utilizing the companion application 144 downloaded in the paired device 143. For example, the companion application 144 may comprise a sync application downloaded in the paired device 143 which may be triggered from the ACR-enabled connected TV device 141. The paired device 143 may comprise, for example, a tablet, a laptop and/or a smartphone. In some embodiments of the invention, Note the 'pairing' could occur via video OR audio fingerprinting. In the latter, the companion application has an audio capture capability that may be operable to generate fingerprints locally on the device and send to an external matching server. In the former, the detection information gathered by the TV via video fingerprinting is passed to the paired device.

The online social network 108 may comprise suitable logic, circuitry, interfaces and/or code that may be operable to provide online social network services to end-users. The online social network 108 may enable its end-users such as, for example, the viewer 106 to send and read messages via a communication network such as the communication network 103. For example, the online social network 108 may comprise Twitter. In such instances, the messages may comprise Twitter messages known as tweets. In an exemplary embodiment of the invention, the viewer 106 may read and/or send messages associated with the online social network 108 via the ACR-enabled devices 140. For example, the viewer 106 may read and/or send tweets utilizing the ACR-enabled connected TV device 141 and/or the paired device 143.

In operation, the ACR module 142 in the ACR-enabled connected TV device 141 may be operable to present messages associated with the online social network 108 via, for example, an overlay. For example, the messages may comprise tweets associated with Twitter. The ACR module 142 in the ACR-enabled connected TV device 141 may be operable to present, based on communication with, for example the ACR system 100, an overlay starting at a time synchronized to an identified event in presented content. The overlay may comprise one or more messages associated with the online social network 108. In instances when the ACR-enabled connected TV device 141 is paired with or associated with the paired device 143 utilizing the companion application 144 downloaded in and running on the paired device 143, the overlay may also be presented on the paired device 143. In this regard, the presented content may comprise, for example, a program, a movie, a game or a commercial that may be associated with a network provided by a network provider such as the network provider 102.

In an exemplary embodiment of the invention, the one or more messages may be pre-generated and prerecorded, before presentation of the content. In this regard, the one or more pre-generated and prerecorded messages may be synchronized to the identified event so that it may be displayed during the presentation of the content. For example, the content may comprise a show. The messages may comprise tweets related to or associated with the identified event in the show, and the tweets may be pre-generated and prerecorded by staff members and/or participants of the show. During presentation of the show on the ACR-enabled connected TV device 141 and/or the paired device 143, the viewer 106 may be able to view the tweets at the time synchronized with the identified event.

In instances when the one or more messages are being presented, the ACR module 142 in the ACR-enabled connected TV device 141 may be operable to present, based on communication with the ACR system 100, for example, one or more additional messages associated with the online social network 108 in the presented overlay. The one or more additional messages may be generated during the presentation of the content. In this regard, for example, during presentation of a program on the ACR-enabled connected TV device 141 and/or on the paired device 143, one or more tweets may be presented in an overlay at certain time synchronized to an identified event in the program. During the presentation of the program, one or more additional tweets may be communicated among the viewer 106 and others such as friends or followers. In such instances, these one or more additional tweets may be added to the presented overlay for viewing.

In an exemplary embodiment of the invention, the one or more messages may be generated, for example, during broadcast or streaming of a program or a movie. The presented content, which comprises the program or the movie, may be presented during a time-delayed playback such as, for example, a DVR playback. In this regard, for example, during the broadcast of a program, one or more tweets related to the program may be generated and presented at certain time, which is synchronized to an identified event in the program. During a DVR playback of the program a few hours later, the generated tweets may be presented synchronously at the time when the identified event occurs in the DVR playback.

In an exemplary embodiment of the invention, the presented content may comprise, for example, a program or a movie and the one or more messages may be generated by a person associated with the program or the movie. In such instances, the ACR module 142 in the ACR-enabled connected TV device 141 may be operable to present, based on communication with, for example the ACR system 100, a second overlay during presentation of an identified advertisement in a commercial break. The second overlay may comprise one or more other messages associated with the online social network 108, and the one or more other messages may also be generated by the same person. In this regard, for example, the person may comprise a participant or host of a show, an actor or an actress of a movie, or even a character in a movie. The person may provide tweets or tweet-in some comments related to or associated with an identified event in a prerecorded program or a scheduled movie. The same person may also provide tweets or tweet-in some other comments related to or associated with an identified advertisement in a commercial break of the program or the movie. During a presentation of the program or the movie, the tweets related to or associated with the identified event may be presented synchronized to the identified event, and during the commercial break, the tweets related to or associated with the identified advertisement may be presented synchronized to the identified advertisement. In this regard, using social messages such as tweets from the same person may enable linking of advertisement with programming experience.

In an exemplary embodiment of the invention, the ACR module 142 in the ACR-enabled connected TV device 141 may be operable to track, based on communication with, for example the ACR system 100, how each of the presented one or more messages is actually being viewed and/or interacted with. For example, some of the tweets in the presented overlay may be viewed and/or replied by the viewer 106 while some of other tweets in the presented overlay may not be viewed at all. This information may be tracked and communicated to a network provider such as the network provider 102. The network provider 102 may utilize this information along with similar or the same information communicated from other end-users to determine or identify which tweet(s) are viewed and/or interacted with the most by end-users.

In another exemplary embodiment of the invention, when an outgoing message associated with the online social network 108 is generated and displayed during presentation of the content, the ACR module 142 in the ACR-enabled connected TV device 141 may be operable to identify, based on communication with, for example the ACR system 100, a particular event in the presented content. The particular event may occur at a time synchronized to a beginning of the presentation of the outgoing message. In this regard, for example, while watching a show or a movie, the viewer 106 may send an outgoing tweet in response to an incoming tweet or for sharing some comments with friend(s) as part of a specific group. A particular event, which occurs in the show or in the movie at the time synchronized to the outgoing message, may be identified. Accordingly, when a recipient of the outgoing tweet is watching the same show or the same movie via a time-delayed playback such as a DVR playback, the outgoing tweet from the viewer 106 may then be presented synchronized to the occurrence of the identified particular event in the show or in the movie, during the time-delayed playback.

Figure 1B:
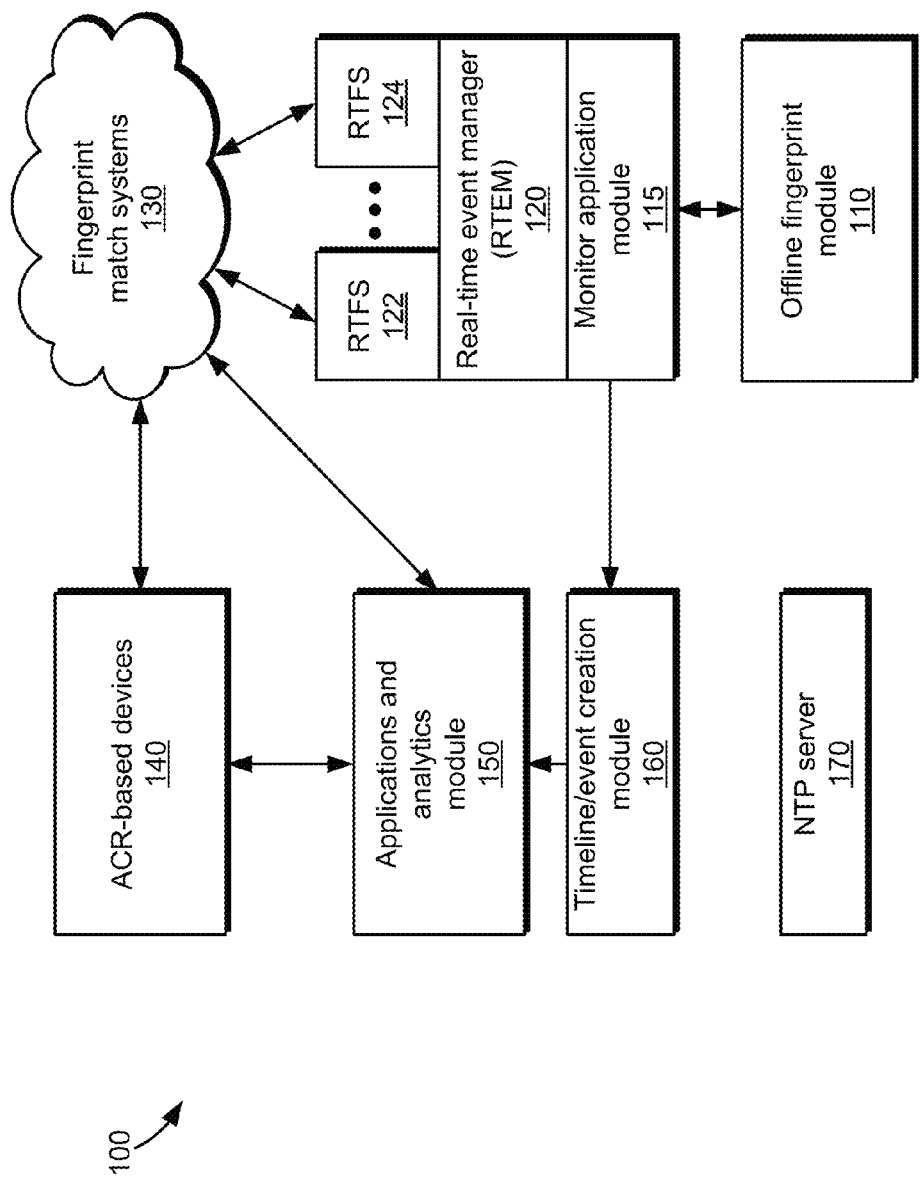
FIG. 1B is a high-level block diagram illustrating an exemplary automatic content recognition system with an abstraction layer, in accordance with an embodiment of the invention.

FIG. 1B is a high-level block diagram illustrating an exemplary automatic content recognition system with an abstraction layer, in accordance with an embodiment of the invention. Referring to FIG. 1B, there is shown an ACR system 100 that implements an abstraction layer to support fingerprinting technology from multiple vendors. The ACR system 100 is operable to support fingerprinting technology from multiple vendors and may be utilized to identify a network television station that provides content for display on a viewing screen based on the logo, symbol, sign, watermark, and/or text that are typically utilized to represent the network television station.

The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, . . . , 124.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, . . . , 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, . . . , 124. In other instances, the fingerprinting locations may be determined by the RTFSs 122, . . . , 124 based on locally and/or remotely stored information. Each fingerprinting location may comprise coordinates in a video frame (e.g., x coordinates, y coordinates) that indicate a particular region in the video frame to fingerprint.

The RTFSs 122, . . . , 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, . . . , 124 in response to the instructions received. In other instances, the fingerprint profiles comprising the fingerprinting locations may be received by the RTFSs 122, . . . , 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, . . . , 124 may be operable to communicate fingerprint profiles and/or fingerprint profile updates to the end-user devices 140 through the fingerprint match systems 130. Feedback and/or queries from the end-user devices 140 may be received by the RTFSs 122, . . . , 124 for processing. The RTFSs 122, . . . , 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, . . . , 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, ..., 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, ..., 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
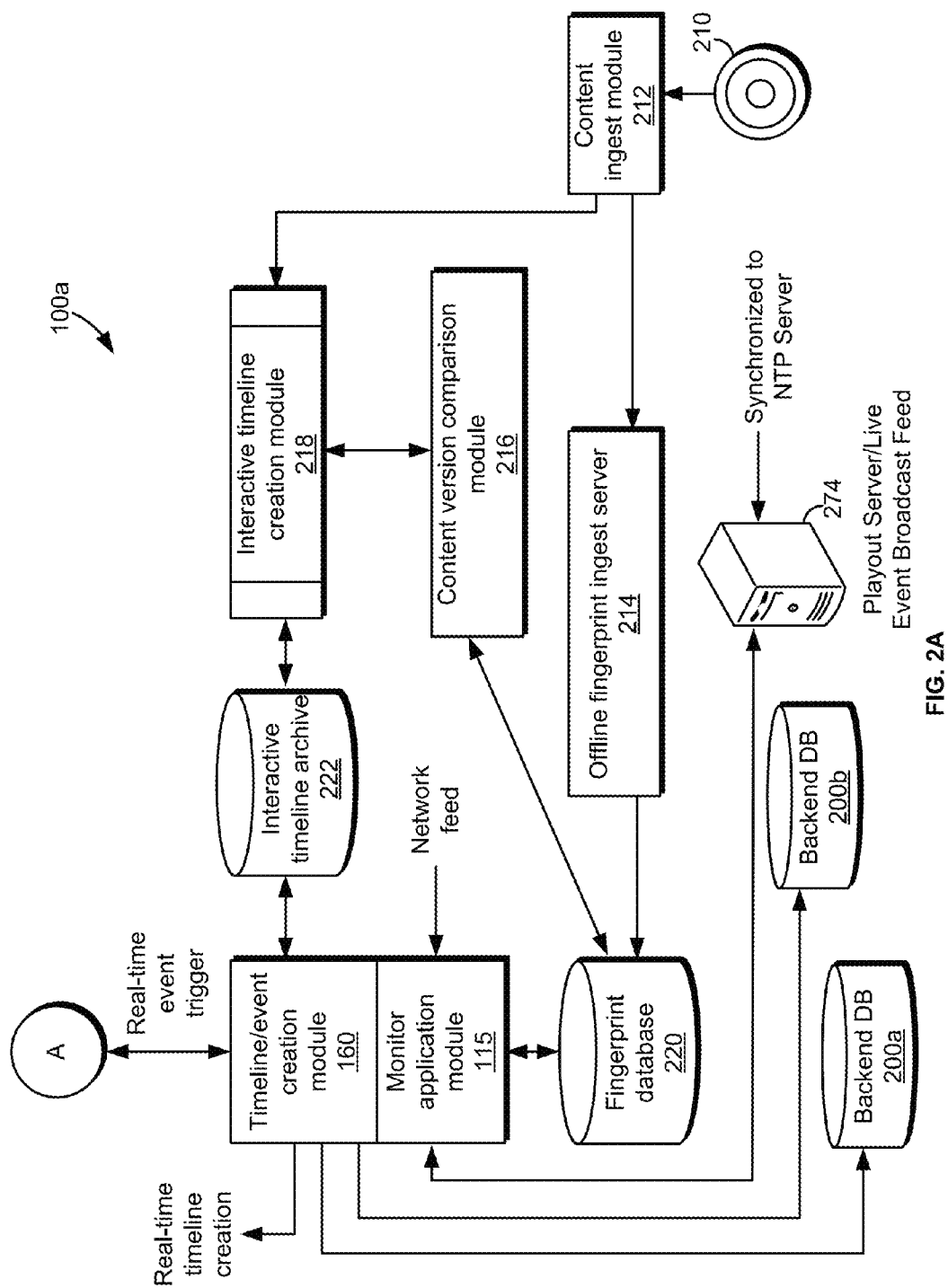
FIGS. 2A-2C are each a block diagram that illustrates details of the exemplary automatic content recognition system with an abstraction layer shown in FIG. 1B, in accordance with embodiments of the invention.
Figure 2B:
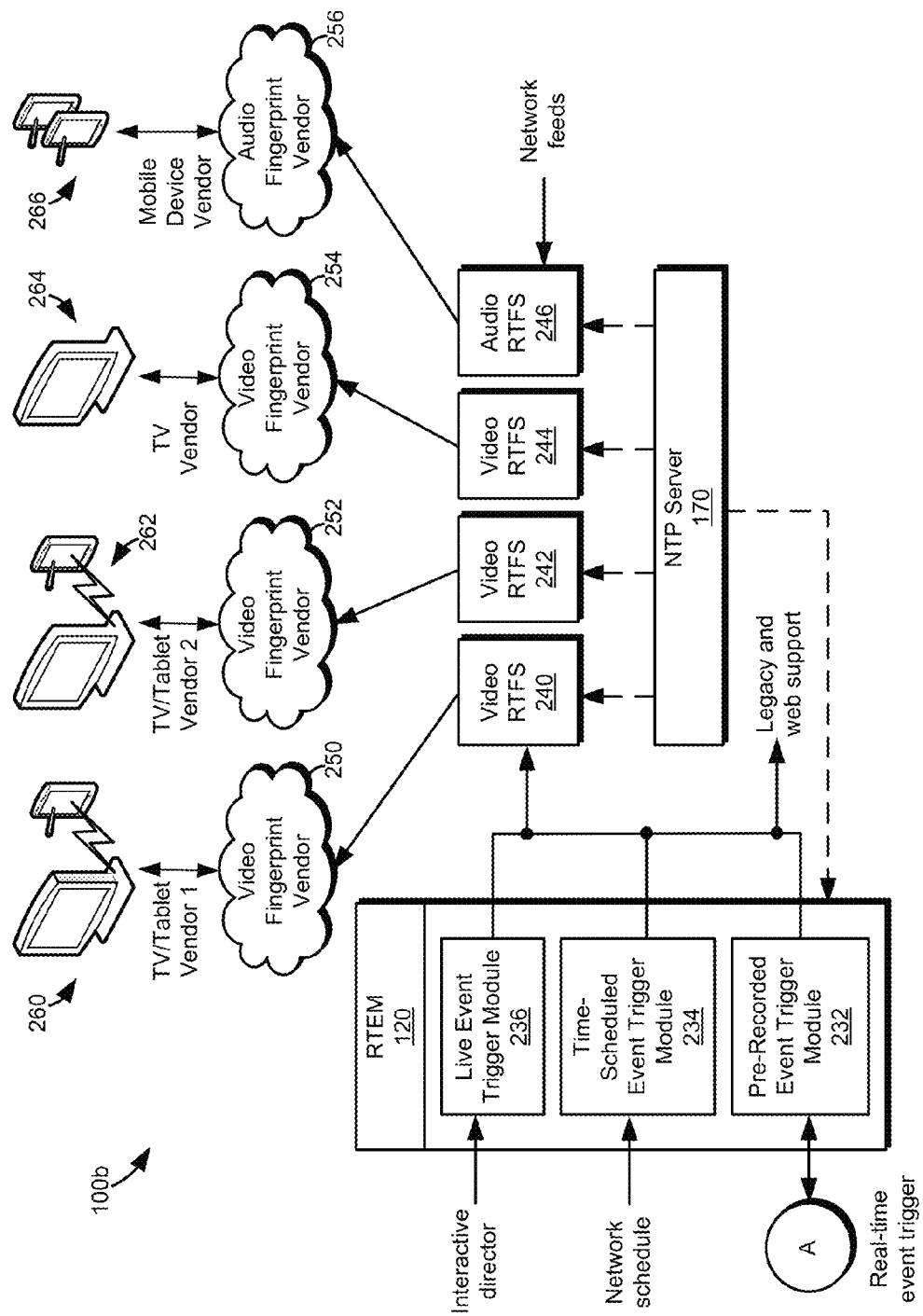
Figure 2C:
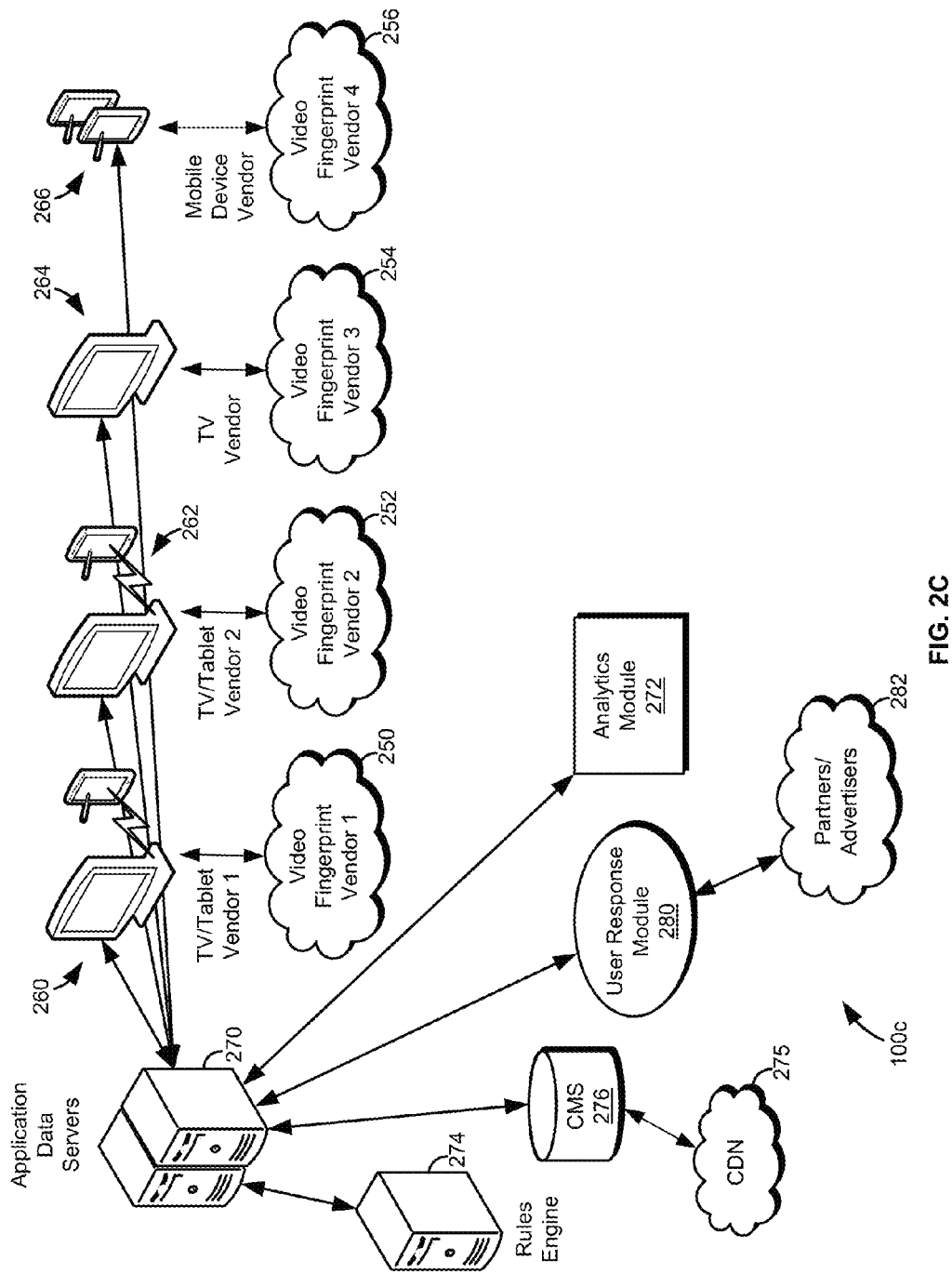

FIGS. 2A-2C are each a block diagram that illustrate details of the exemplary automatic content recognition system with abstraction layer shown in FIG. 1B, in accordance with embodiments of the invention. Referring to FIG. 2A, there is shown a portion 100a of the ACR system 100 that may substantially correspond to at least portions of the offline fingerprint module 110, the monitor application 115, and the timeline/event creation module 160 described above with respect to FIG. 1. The portion 100a may comprise a content ingest module 212, an offline fingerprint ingest server 214, a content version comparison module 216, and a fingerprint database 220. The portion 100a may also comprise an interactive timeline creation module 218, an interactive timeline archive 222, the monitor application module 115, and the timeline/event creation module 160. Also shown are backend databases (DB) 200a and 200b connected to the timeline/event creation module 160 and a playout server 274 connected to the monitor application module 115.

The content ingest module 212 may comprise suitable logic, circuitry, code, and/or interfaces that may be operable to receive a media master 210, also referred to as an air master, which may comprise one or more programs, commercials, and/or promotions, for example. The content ingest module 212 may be operable to generate or create a set of proxy videos by encoding the media master 210 utilizing different resolutions. The highest quality proxy video may be provided as an input to the offline fingerprint ingest server 214 while the lowest quality proxy video may be provide to the interactive timeline creation module 218. The content ingest module 212 may also provide a content ID (CID) and other associated metadata (e.g., program data, frame number) that corresponds to the content in the media master 210.

The offline fingerprint ingest server 214 may comprise suitable logic, circuitry, code, and/or interfaces that may be operable to use a fingerprint computation or algorithm to fingerprint content and subsequently push the fingerprints for archival in the fingerprint database 220. In the offline fingerprint ingest server 214, the highest quality proxy video created by the content ingest module 212 may be fingerprinted and may be associated with the content ID and corresponding related metadata. In this regard, the offline fingerprint ingest server 214 may utilize an API to automatically ingest the media files and associated metadata from the content ingest module 212. A graphical user interface (GUI) may also be supported to manually ingest media files and to enter associated metadata.

The offline fingerprint ingest server 214 may be operable to provide a management interface for the fingerprint database 220 and/or the content version comparison module 216. For example, an API may be utilized to remove content from the fingerprint database 220. A GUI may also be supported to manually remove content from the fingerprint database 220. The offline fingerprint ingest server 214 may be operable to set priorities regarding the content to be ingested and processed. Moreover, the offline fingerprint ingest server 214 may be operable to support, among other features, the use of administration tools and the creation of reports, the ability to generate progress reports on processing content and errors, and/or recoverability after a shut down or crash.

The offline fingerprint ingest server 214 may be implemented utilizing multiple modules (not shown). These modules may be operable to perform one or more functions. Examples of those functions may comprise, without limitation, receiving the content to be fingerprinted in an input or watch folder, receiving and assigning CIDs and processing priority utilizing content ingest management tools, supporting an ACR process for writing fingerprints to the fingerprint database 220, and supporting administration tools utilized for monitoring and reporting.

The fingerprint database 220, which may also be referred to as a central fingerprint database, for example, may comprise suitable logic, circuitry, code, and/or interfaces that may be operable to store fingerprints captured by the offline fingerprint ingest server 214 and maintain the association between the captured fingerprints and a particular CID and media time.

In an embodiment of the invention, the fingerprint database 220 may support queries from multiple monitor applications 224. For example and without limitation, as many as 50 monitor applications 224 may query the fingerprint database 220. In response to a query, the fingerprint database 220 may return a CID and a media time associated with the fingerprint in a very short period of time, typically in less than one second. For example and without limitation, the return time by the fingerprint database 220 may be less than 10 milliseconds.

The fingerprint database 220 may also be operable to respond to requests from the content version comparison module 216 to identify differences between the master versions in the fingerprint database 220 and derivative works also ingested into the fingerprint database 220. For example, a movie may have different cuts or versions depending on the time of day and/or the network in which it is to be shown. The corresponding master and the derivative works may be ingested, fingerprinted, and stored in the fingerprint database 220. The interactive timeline creation module 218 may have access to the various versions of a certain work but it can identify the master version from any of the other cuts or versions. Typically, a request is initiated by the content version comparison module 216 to identify the differences (e.g., deltas) between the master and selected derivative works. A "delta" file is returned to the interactive timeline creation module 218, which incorporates the changes from the master source and automatically generates a derivative event timeline. Multiple derivative works may be compared to the master in the content version comparison module 216 to reduce the processing necessary to handle the other versions.

The fingerprint database 220 may be implemented as a distributed, fault-tolerant database that is operable to support persistent storage of fingerprints. The fingerprint database 220 may be operable to store large amounts of content fingerprints. For example and without limitation, the fingerprint database 220 may store up to 25,000 hours of content fingerprints. The number of hours of content fingerprints that can be stored may vary based on the availability of storage capacity in the fingerprint database 220.

The fingerprint database 220 may also be operable to concurrently support the reception of content from multiple offline fingerprint ingest servers 214, respond to queries from multiple monitor applications 224, and/or respond to queries from multiple content version comparison modules 216. For example and without limitation, the fingerprint database 220 may receive content from up to 10 offline fingerprint ingest servers 214. In another example and without limitation, the fingerprint database 220 may respond to queries from up to 50 monitor applications 224. In yet another example and without limitation, the fingerprint database 220 may respond to queries from up to five content version comparison modules 216. The number of requests and/or of content version comparison modules 216 that can be supported by the fingerprint database 220 may vary based on the capacity of the fingerprint database 220.

The fingerprint database 220 may be operable to support, among other features, administrative tools and report generation, management tools to report errors, and/or recoverability after a shut down or crash.

The fingerprint database 220 may be implemented utilizing multiple modules (not shown). These modules may comprise a fingerprint storage module as well as other modules that are operable to support the process of ingesting content from the offline fingerprint ingest server 214, the process of responding with a CID and media time to the monitor application module 115, and/or the process of responding to the content version comparison module 216. One or more modules may also be implemented to support administrative tools, monitoring, and/or reporting, for example.

The content version comparison module 216 may comprise suitable logic, circuitry, code, and/or interface that may be operable as a tool that enables comparison of a master version of some content to a derivative version of that same content based on fingerprints stored in the fingerprint database 220. A derivative work or piece may refer to a version of a program, promotion, or commercial, for example, that is different from a master version of that same program, promotion, or commercial. The content version comparison module 216 may return a file listing the differences between the master version and the derivative work based on a time code. The file may be provided to the interactive timeline creation module 218, for example.

The content version comparison module 216 may be operable to identify sequences that have been edited to shorten the time of handling the derivative work, the insertion of new advertisement break locations, and/or the insertion of new content. An example of the insertion of new advertisement break locations may comprise the addition of black frames of between 5 and 15 seconds. An example of the insertion of new content may occur in instances when the derivative work is the director's cut rather than the original theatrical master. The content version comparison module 216 may pass or communicate a difference file to the interactive timeline creation module 218 to be utilized for automating the creation of a new interactive timeline for a unique edit of a program based on the network, the day, and/or the time of day on which the program is to be shown.

The content version comparison module 216 may also be operable to query the fingerprint database 220 for information (e.g., fingerprints) to perform version comparison, to identify advertisement break locations based on black frames of between 5 and 15 seconds, and/or to generate an extensible markup language (XML) or similar output file that indicates the differences between a derivative piece and a master version. Moreover, the content version comparison module 216 may support, among other features, the use of administration tools and the creation of reports, the ability to generate progress reports on processing content and errors, and/or recoverability after a shut down or crash.

The content version comparison module 216 may be implemented utilizing multiple modules (not shown). These modules may be operable to perform one or more functions such as, for example, querying the fingerprint database 220 and performing file comparison. One or more modules may also be implemented to support administrative tools, for monitoring, and/or reporting, for example. The monitor application module 115 may comprise suitable logic, circuitry, code, and/or interfaces that may be operable to ingest a live broadcast television linear video feed and fingerprint the content in the feed in real time. The live broadcast television linear video feed may also be referred to as a network television feed, for example. The live broadcast television linear video feed can be based on a Serial Digital Interface (SDI) video interface and/or on a High-Definition SDI (HD-SDI) video interface. These fingerprints may be compared by the monitor application module 115 against fingerprints stored in the fingerprint database 220. When the comparison results in a fingerprint match, the fingerprint database 220 may return to the monitor application module 115 the CID and the media time of that match. The CID and the media time may then be provided to the timeline/event creation module 226. An API may be utilized to handle the communication between the monitor application module 115 and the timeline/event creation module 226.

As noted above, the monitor application module 115 may be operable to support, for example, a SDI and/or a HD-SDI for input that are provided from the broadcast chain prior to encoding and uplink. In this regard, the broadcast chain may provide the network television feed to the monitor application module 115. Other interfaces and/or formats may also be supported.

The monitor application module 115 may function so that it operates ahead of any ACR-based device or viewer device that is in the field, such as in a user's home, for example. Although the amount of time that the monitor application module 115 may be ahead from ACR-based devices in the field may vary, in a typical case the monitor application module 115 may be approximately at least 3 seconds ahead, for example.

The monitor application module 115 may be operable to query the fingerprint database 220 to determine the CID and the media time or media timeline. The monitor application module 115 may be operable to support an API that enables the monitor application module 115 to report the CID and the media time to a real-time event trigger infrastructure that is represented by the label "A" in FIG. 2A. Moreover, the monitor application module 115 may support, among other features, the use of administration tools and the creation of reports, the use of management tools for reporting errors, and/or the handling of failover/recovery operations.

The monitor application module 115 may be implemented utilizing multiple modules (not shown). These modules may comprise a module for video capture from an SDI/HD-SDI capture card, a module that provides real-time fingerprinting and querying of the fingerprint database 220, and a module that supports an API to communicate the CID, media time, and other data (e.g., duplicate CIDs, mediatime, confidence, number of seconds). One or more modules may also be implemented to support administrative tools, monitoring, and/or reporting, for example.

The timeline/event creation module 226, which may be implemented as part of the monitor application 226, may comprise suitable logic, circuitry, code, and/or interfaces that may be operable to query the interactive timeline archive 222 for events associated with the CID. The timeline/event creation module 226 may be operable to utilize the CID and the media time received by the monitor application module 115 from the fingerprint database 220 to look up event IDs in the interactive timeline archive 222. The event IDs are used to create a real-time timeline (i.e., schedule) in XML or other standard data format and real-time event triggers.

The interactive timeline creation module 218 may comprise suitable logic, circuitry, code, and/or interfaces that may be operable to utilize the proxy video generated by the content ingest module 212 and link an interactive timeline against the fingerprinted media. The interactive timeline may comprise one or more event IDs associated with a particular time in a program, commercial, or promotion. The interactive event IDs may be referred to as interactive event IDs, for example. The interactive timeline archive 222 may comprise suitable logic, circuitry, code, and/or interfaces that may be operable to store multiple interactive timelines.

In operation, the air master 210 is received and ingested by the content ingest module 212 and a proxy video is created. The highest quality proxy video generated by the content ingest module 212 may be provided to the offline fingerprint ingest server 214 while a lower quality proxy video generated by the content ingest module 212 may be provided to the interactive timeline creation module 218. The offline fingerprint ingest server 214 may fingerprint the high quality proxy video and may send the fingerprints to the fingerprint database 220 for archiving. In addition to the fingerprints, CIDs and media times may be stored in the fingerprint database 220.

The interactive timeline creation module 218 may receive the proxy video and may link event IDs that represent certain desired interactive events with the program's timeline to generate an interactive timeline. The interactive timeline may be stored in the interactive timeline archive 222.

When a derivative piece or different version from a master version is ingested, the content version comparison module 216 may compare fingerprints of the master version with fingerprints from the derivative piece to generate a difference file that is provided to the interactive timeline creation module 218. The interactive timeline creation module 218 may utilize the difference file to create an interactive timeline for the derivative piece from an interactive timeline previously generated for the master version.

The monitor application module 115 receives a network television feed and fingerprints the video content in the feed. The fingerprints generated are compared to those stored in the fingerprint database 220 to obtain CIDs media times, and potentially to act when a match is detected. The interactive timeline archive 222 may be queried to obtain event IDs associated with the CIDs. When event IDs are obtained, the timeline/event creation module 226 may generate a real-time timeline XML (or similar data format) feeds and may also generate real-time event triggers that may be communicated to a real-time event trigger infrastructure.

Referring to FIG. 2B, there is shown a portion 100b of the ACR system 100 that may comprise the RTEM 120, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2B are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2B. The NTP server 170 of FIG. 1 is shown providing reference timing to the RTEM 120 and the RTFSs 240, 242, 244, and 246.

Also shown in FIG. 2B are various viewer devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The viewer devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the viewer devices 260. These services may comprise video fingerprint matching as well as the delivery of any interactive event IDs associated with a match. In addition, the video fingerprint vendor 250 may provide a network television station identifier and/or network timing information (e.g., heartbeat message or NTP-based network timestamp) that may be utilized by the viewer devices 260 for ACR-related applications and/or to maintain synchronization with the network television feed. The viewer devices 260 may comprise suitable logic, circuitry, code, and/or interfaces that may be operable to take and send video fingerprints to the video fingerprint vendor 250 for matching.

The viewer devices 262 may be operable to utilize the same video fingerprinting technology utilized by the video RTFS 242 and supported by the video fingerprint vendor 252. The video fingerprinting technology utilized by the viewer devices 262 may be different from that utilized by the viewer devices 260. The video fingerprint vendor 252 may be a vendor, manufacturer, or other third-party service provider that may comprise suitable logic, circuitry, code, and/or interfaces operable to provide hosted services over the internet for the viewer devices 262. These services may comprise video fingerprint matching as well as the delivery of any interactive event IDs associated with a match. In addition, the video fingerprint vendor 252 may provide a network television station identifier and/or network timing information that may be utilized by the viewer devices 262 for ACR-related applications and/or to maintain synchronization with the network television feed. The viewer devices 262 may comprise suitable logic, circuitry, code, and/or interfaces that may be operable to take and send video fingerprints to the video fingerprint vendor 252 for matching.

The viewer devices 260 and 262 may be operable to communicate with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The viewer devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the viewer devices 264. These services may comprise video fingerprint matching as well as the delivery of any interactive event IDs associated with a match. In addition, the video fingerprint vendor 254 may provide a network television station identifier and/or network timing information that may be utilized by the viewer devices 264 for ACR-related applications and/or to maintain synchronization with the network television feed. The viewer devices 264 may comprise suitable logic, circuitry, code, and/or interfaces that may be operable to take and send video fingerprints to the video fingerprint vendor 254 for matching.

The viewer devices 266 may utilize the same audio fingerprinting technology (e.g., audio ACR) utilized by the audio RTFS 246 and supported by the audio fingerprint vendor 256. The viewer devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the viewer devices 266. These services may comprise audio fingerprint matching as well as the delivery of any interactive event IDs associated with a match. In addition, the audio fingerprint vendor 256 may provide a network television station identifier and/or network timing information that may be utilized by the viewer devices 260 for ACR-related applications and/or to maintain synchronization with the network television feed. The viewer devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding viewer devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTEM 120 may comprise suitable logic, circuitry, code, and/or interfaces that may be operable to perform real-time event triggering. In this regard, the RTEM 120 may be operable to manage real-time events based on inputs from different sources. For example, the RTEM 120 may comprise a pre-recorded event trigger module 232 to provide real-time triggering from the monitor application module 115, a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 120 may also be operable to trigger interactive events in legacy television systems and/or in web-based systems. The infrastructure provided by the RTEM 120 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 120 may be operable to assign interactive event IDs to particular fingerprints in a sequence of audio or video fingerprints generated by the RTFSs 240, . . . , 246. The RTEM 120 may also be operable to provide television network station identifiers and/or network timing information associated with any sequence of fingerprints.

In the example shown in FIG. 2B, the RTFSs 240, ..., 246 may correspond to the RTFSs 122, ..., 124, the fingerprint vendors 250, ..., 256 may correspond to the fingerprint match systems 130, and the viewer devices 260, ..., 266 may correspond to the ACR-based devices 140, which are illustrated in FIG. 1.

In operation, the RTEM 120 may generate and/or handle one or more interactive event IDs that correspond to a particular set of fingerprints generated by the RTFSs 240, ..., 246. The RTEM 120 may have determined the interactive event IDs based on live event inputs, time-scheduled event inputs, and/or pre-recorded event inputs. The RTEM 120 may assign or associate the interactive event IDs to their appropriate fingerprints based on the synchronization of its operation to the operation of the RTFSs 240, ..., 246 via broadcast NTP. The RTEM 120 may also provide television network station identifiers and/or network timing information to the RTFSs 240, ..., 246. The RTFSs 240, ..., 246 may communicate the fingerprints, interactive event IDs, the television network station identifiers, and/or the network timing information to their corresponding fingerprint vendors.

The client or viewer devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100b in FIG. 2B may illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2C, there is shown a portion 100c of the ACR system 100 that may comprise the viewer devices 260, ..., 266 and the fingerprint vendors 250, ..., 256 shown in FIG. 2B. Also shown are application data servers 270, an analytics module 272, a rules engine 274, a cloud-based content delivery network (CDN) 275, and a content management system (CMS) 276. In addition, FIG. 2C shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to viewer devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., viewer devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the viewer devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the viewer devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may comprise one or more back-end databases to store, mange, and/or process user information.

In operation, content may be provided by the application data servers 270 to one of the viewer devices 260, ..., 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on viewer devices. The advertisement servers may also be operable to support the tracking of user impressions and click-throughs and/or to perform other advertising-related functions.

Figure 3:
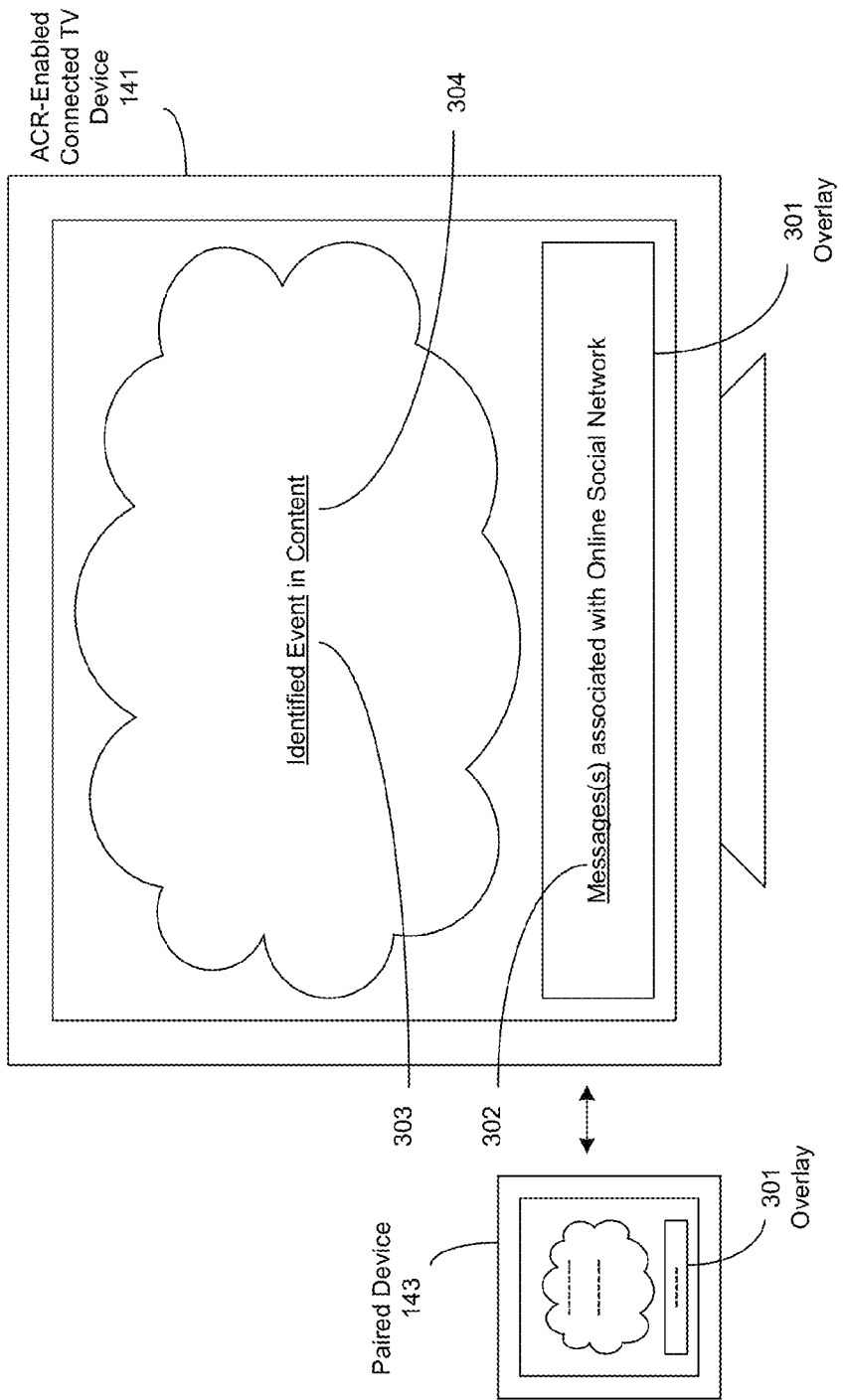
FIG. 3 is a block diagram illustrating an exemplary synchronization of messages to content, in accordance with an embodiment of the invention.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways FIG. 3 is a block diagram illustrating an exemplary synchronization of messages to content, in accordance with an embodiment of the invention. Referring to FIG. 3, there is shown an ACR-enabled connected TV device 141 presenting or displaying an overlay 301. The overlay 301 may comprise one or more messages 302 associated with an online social network such as the online social network 108. These messages may be synchronized to the content or could be an aggregate of both synchronized messages and content related messages from the online network. The ACR-enabled connected TV device 141 may be paired with or associated with a paired device 143. The ACR-enabled connected TV device 141 and the paired device 143 are described with respect to FIG. 1A.

In an exemplary operation, the ACR module 142 in the ACR-enabled connected TV device 141 may be operable to present, based on communication with, for example the ACR system 100, the overlay 301 starting at a time that is synchronized to an identified event 303 in presented content 304. The overlay 301 may comprise one or more messages 302 associated with the online social network 108. In instances when the ACR-enabled connected TV device 141 is paired with or associated with the paired device 143 utilizing the companion application 144 downloaded in and running on the paired device 143, the overlay 301 may also be presented on the paired device 143. The presented content 304 may comprise, for example, a program, a movie, a game or a commercial associated with a network provided by a network provider such as the network provider 102. In this regard, for example, the message(s) 302 may comprise tweet(s) associated with Twitter.

In an exemplary embodiment of the invention, the one or more messages 302 may be pre-generated and prerecorded, before presentation of the content 304. The one or more pre-generated and prerecorded messages may be synchronized to the identified event 303 during the presentation of the content 304. For example, the content 304 may comprise a show. The messages 302 may comprise tweets related to or associated with the identified event 303 in the show, and the tweets may be pre-generated and prerecorded by staff members and/or participants of the show. During presentation of the show on the ACR-enabled connected TV device 141 and/ or on the paired device 143, the viewer 106 may be able to view the tweets at the time synchronized with the identified event 303.

Figure 4:
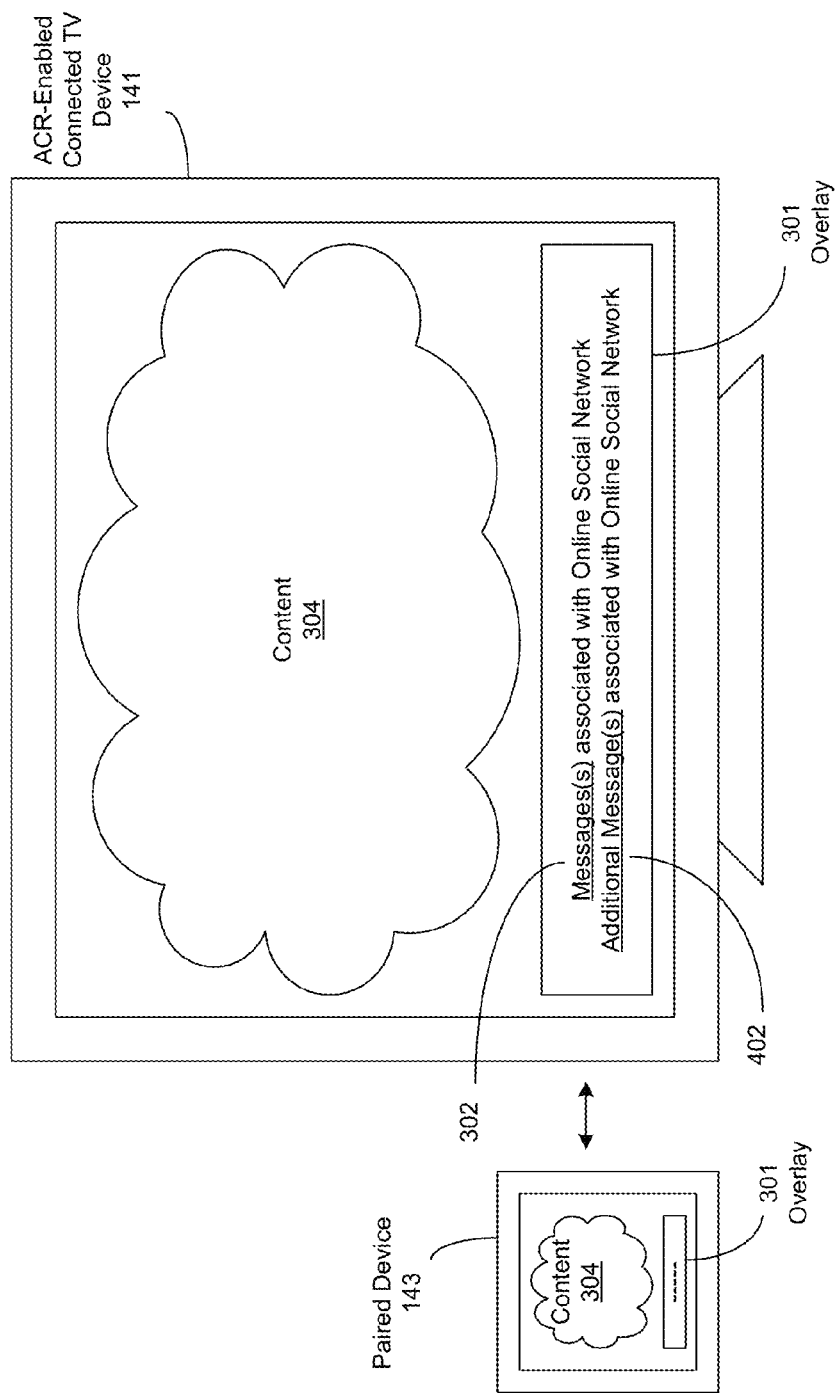
FIG. 4 is a block diagram illustrating an exemplary presentation of additional messages in overlay, in accordance with an embodiment of the invention.

FIG. 4 is a block diagram illustrating an exemplary presentation of additional messages in overlay, in accordance with an embodiment of the invention. Referring to FIG. 4, there is shown an ACR-enabled connected TV device 141 presenting or displaying content 404 and an overlay 301. The overlay 301 may comprise one or more messages 302 that may be associated with an online social network such as the online social network 108. The overlay 301 may also comprise one or more additional messages 402 that may be associated with the online social network 108. The ACR-enabled connected TV device 141 may be paired with or associated with a paired device 143. The ACR-enabled connected TV device 141 and the paired device 143 are described with respect to FIG. 1A.

In an exemplary operation, in instances when the one or more messages 302 are being presented in the overlay 301 during presentation of the content 404, the ACR module 142 in the ACR-enabled connected TV device 141 may be operable to present, based on communication with the ACR system 100, for example, one or more additional messages 402 associated with the online social network 108 in the presented overlay 301. The one or more additional messages 402 may be generated during the presentation of the content 304. In this regard, for example, the content 304 may comprise a program and the messages 302 may comprise tweets associated with Twitter. During presentation of the program on the ACR-enabled connected TV device 141 and/or on the paired device 143, one or more tweets may be presented in the overlay 301 at certain time synchronized to an identified event such as the identified event 303 in the program. During the presentation of the program, one or more additional tweets may be communicated among the viewer 106 and others such as friends or followers or a specific group to which the viewer is subscribed. In such instances, these one or more additional tweets may be added to the presented overlay 301 for viewing.

Figure 5:
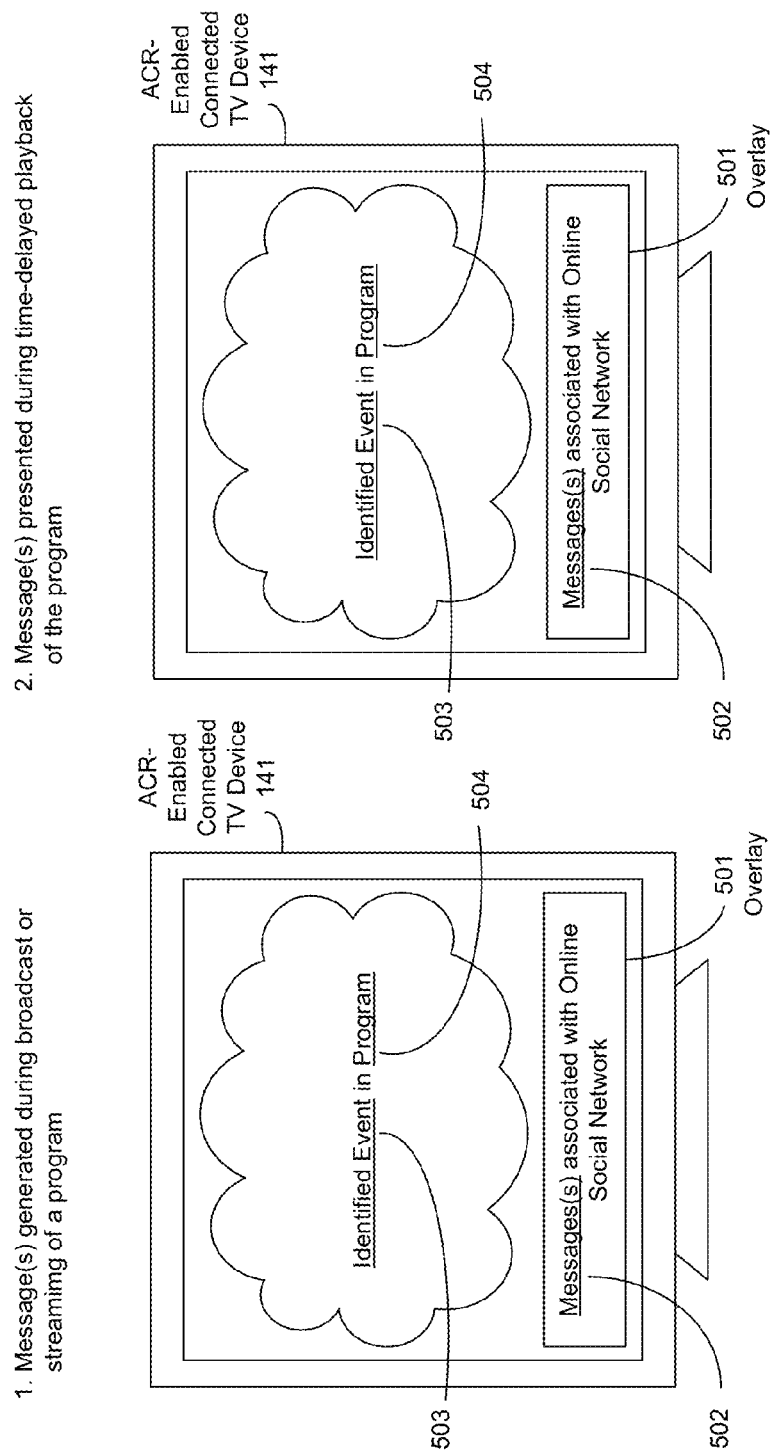
FIG. 5 is a block diagram illustrating an exemplary synchronization of messages to content during time-delayed playback, in accordance with an embodiment of the invention.

FIG. 5 is a block diagram illustrating an exemplary synchronization of messages to content during time-delayed playback, in accordance with an embodiment of the invention. Referring to FIG. 5, there is shown an ACR-enabled connected TV device 141 presenting an overlay 501 comprising one or more generated messages 502 associated with an online social network such as the online social network 108, during broadcast or streaming of a program such as the program 504. The ACR-enabled connected TV device 141 is described with respect to FIG. 1A. There is also shown the ACR-enabled connected TV device 141 presenting the overlay 501 comprising the one or more messages 502 associated with the online social network 108, during a time-delayed playback such as a DVR playback of the program 504.

In an exemplary operation, the one or more messages 502 associated with the online social network 108 may be generated in the overlay 501 during broadcast or streaming of the program 504. The one or more messages 502 are generated at a time that may be synchronized to an identified event 503 in the program 504. During a time-delayed playback such as, for example, a DVR playback of the program 504, the ACR module 142 in the ACR-enabled connected TV device 141 may be operable to present the one or more messages 502 in the overlay 501 starting at the time that is synchronized to the identified event 503 in the program 504. In this regard, for example, during the broadcast of the program 504, one or more tweets related to the program 504 may be generated and presented at a certain time that is synchronized to the identified event 503 in the program 504. During a DVR playback of the program 504 a few hours or days later, the generated tweets may be presented synchronously at the time when the identified event 503 actually occurs in the DVR playback. If the viewer watching delayed playback is subscribed to a group that includes the viewer that issued the original comments a notification may be presented to highlight that said viewer of the group has new comments. In addition and without loss of generality, the viewer originating the comment may direct it to a specific member or members of a subscribed group, which may be part of the online social network. A notification is provided to the intended recipient(s) of the comments upon accessing the service on the connected TV or paired device while watching the corresponding content.

Figure 6:
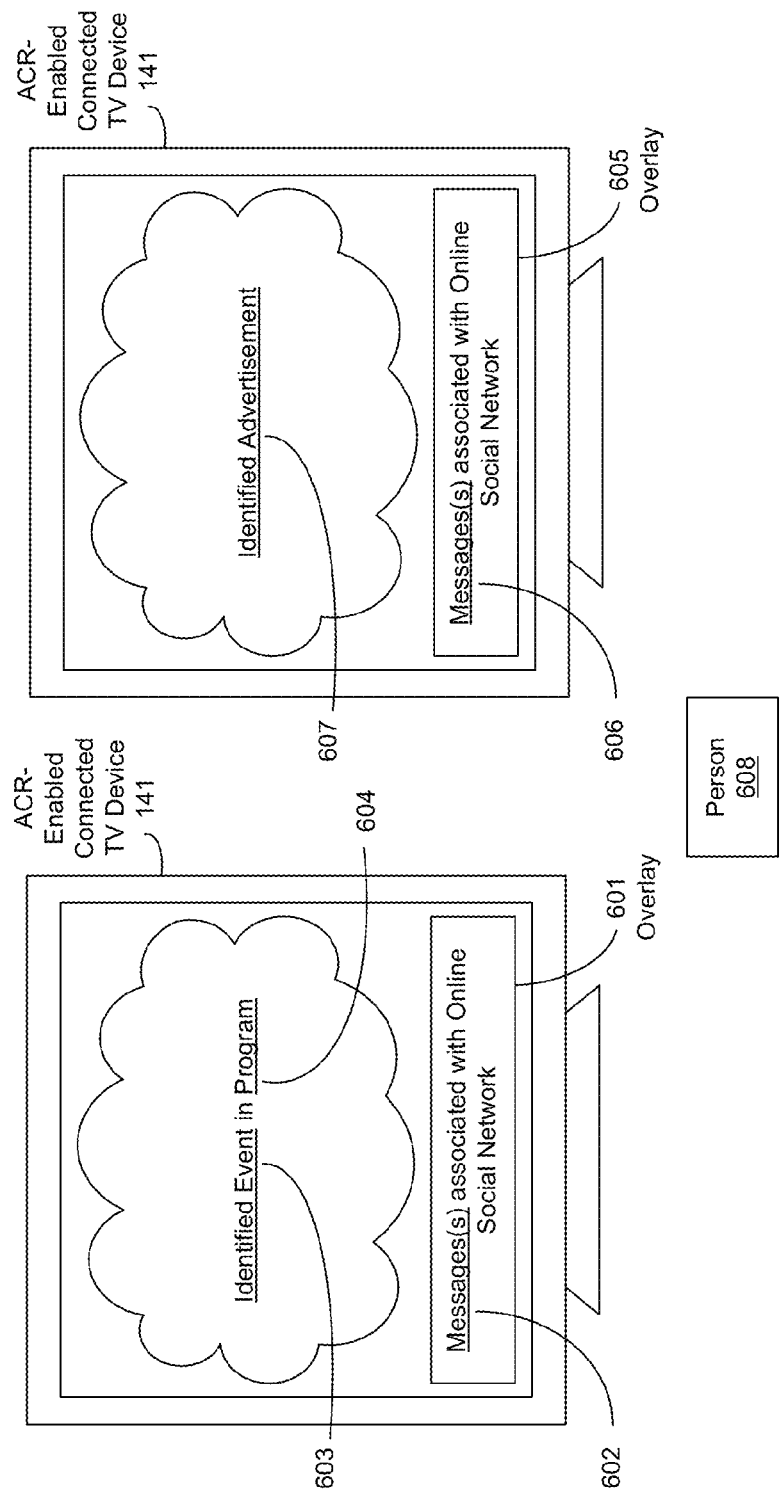
FIG. 6 is a block diagram illustrating an exemplary presentation of messages in commercial break, in accordance with an embodiment of the invention.

FIG. 6 is a block diagram illustrating an exemplary presentation of messages in commercial break, in accordance with an embodiment of the invention. Referring to FIG. 6, there is shown a person 608 and an ACR-enabled connected TV device 141 presenting an overlay 601 comprising one or more messages 602 associated with an online social network such as the online social network 108, during presentation of a program such as the program 604. The ACR-enabled connected TV device 141 is described with respect to FIG. 1A. There is also shown the ACR-enabled connected TV device 141 presenting an overlay 605 comprising one or more other messages 606 associated with the online social network 108, during a commercial break associated with the program 604.

In an exemplary operation, the one or more messages 602 may be generated by the person 608 associated with the program 604. The message(s) 602 may be generated synchronized to an identified event such as the identified event 603 in the program 604. In such instances, the ACR module 142 in the ACR-enabled connected TV device 141 may be operable to present, based on communication with, for example the ACR system 100, another overlay 605, during presentation of an identified advertisement such as the identified advertisement 607 in the commercial break. The overlay 605 may comprise one or more other messages 606 associated with the online social network 108, and the one or more other messages 606 may also be generated by the person 608. In this regard, for example, the person 608 may comprise a participant or host of a show. The person 608 may provide tweets or tweet-in some comments related to or associated with the identified event 603 in a prerecorded program 604. The person 608 may also provide tweets or tweet-in some other comments related to or associated with the identified advertisement 607 in a commercial break of the program 604. During a presentation of the program 604, the tweets related to or associated with the identified event 603 may be presented so that they are synchronized to the identified event 603. During the commercial break, the tweets related to or associated with the identified advertisement 607 may be presented so that they synchronized to the identified advertisement 607. In this regard, using social messages such as tweets from the same person 608 may enable linking of advertisements with programming experience.

Figure 7:
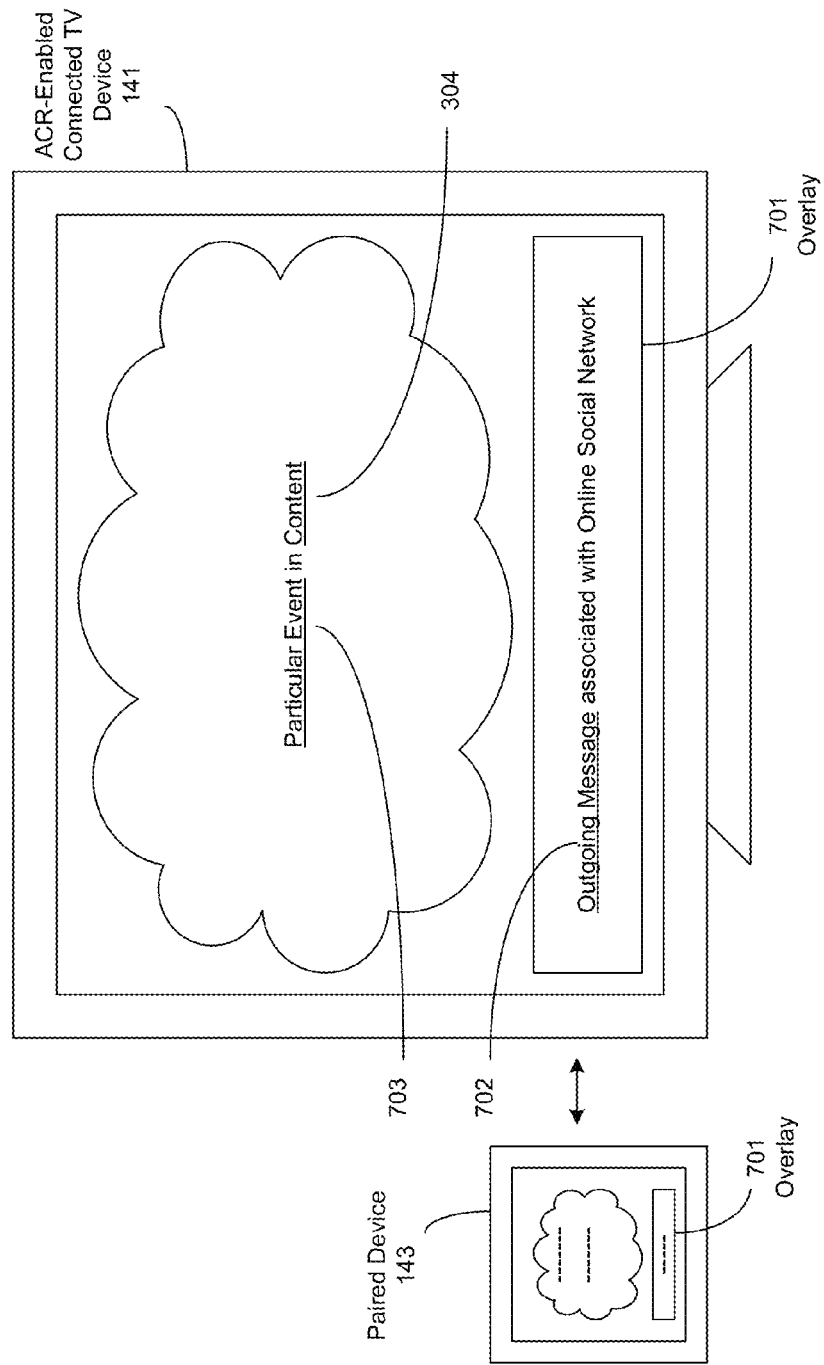
FIG. 7 is a block diagram illustrating an exemplary presentation of an outgoing message in overlay, in accordance with an embodiment of the invention.

FIG. 7 is a block diagram illustrating an exemplary presentation of an outgoing message in overlay, in accordance with an embodiment of the invention. Referring to FIG. 7, there is shown an ACR-enabled connected TV device 141 presenting or displaying an overlay 701. The overlay 701 may comprise an outgoing message 702 associated with an online social network such as the online social network 108. The ACR-enabled connected TV device 141 may be paired with or associated with a paired device 143. The ACR-enabled connected TV device 141 and the paired device 143 are described with respect to FIG. 1A.

In an exemplary operation, when the outgoing message 702 associated with the online social network 108 is generated and displayed during presentation of the content 304, the ACR module 142 in the ACR-enabled connected TV device 141 may be operable to identify (vis timecode or live trigger), based on communication with, for example the ACR system 100, a particular event 703 in the presented content 304, and the particular event 703 may occur at a time synchronized to a beginning of the presentation of the outgoing message 702. In this regard, for example, while watching a show or a movie, the viewer 106 may send an outgoing tweet in response to an incoming tweet or for sharing some comments with friend(s). A particular event 703, which occurs in the show or in the movie at the time synchronized to the outgoing message 702 may be identified. Accordingly, when a recipient of the outgoing tweet is viewing the same show or the same movie via a time-delayed playback such as, for example, a DVR playback, the outgoing tweet from the viewer 106 may then be presented so that, during the time-delayed playback, it is synchronized to the occurrence of the identified particular event 703 in the show or in the movie, during the time-delayed playback.

Figure 8:
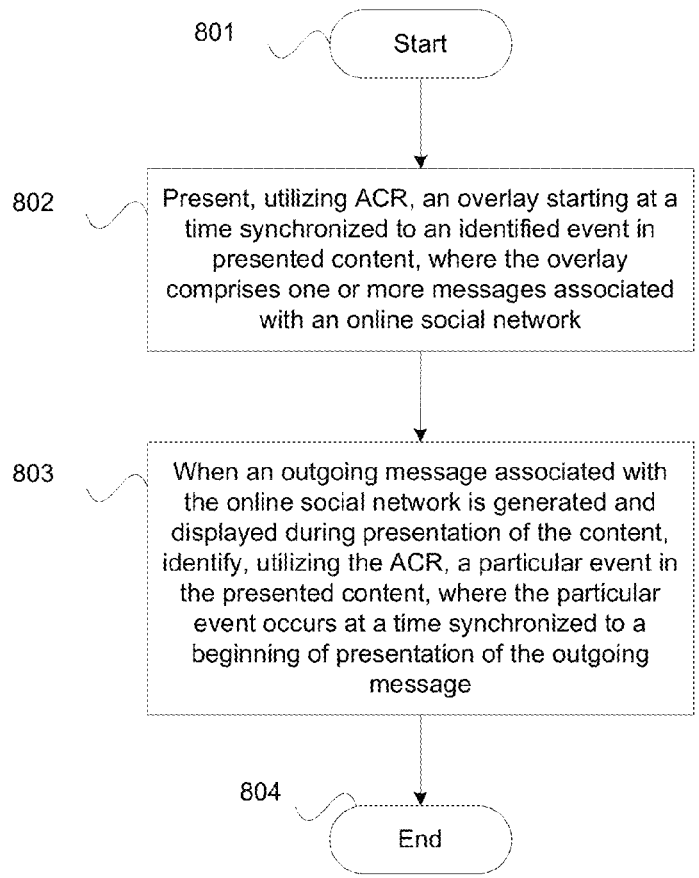
FIG. 8 is a flow chart illustrating exemplary steps for synchronization of messages to content utilizing automatic content recognition, in accordance with an embodiment of the invention.

FIG. 8 is a flow chart illustrating exemplary steps for synchronization of messages to content utilizing automatic content recognition, in accordance with an embodiment of the invention. Referring to FIG. 8, the exemplary steps start at step 801. In step 802, the ACR module 142 in the ACR-enabled connected TV device 141 may be operable to present, utilizing ACR, for example by communicating with the ACR system 100, an overlay 301 starting at a time synchronized to an identified event 303 in presented content 304. The overlay 301 may comprise one or more messages 302 associated with an online social network 108. In this regard, the presented content 304 may comprise, for example, a program, a movie, a game or a commercial associated with a network provided by a network provider such as the network provider 102. In instances when the ACR-enabled connected TV device 141 is paired with or associated with the paired device 143 utilizing the companion application 144 downloaded in and running on the paired device 143, the overlay 301 may also be presented on the paired device 143.

In step 803, in instances when an outgoing message 702 associated with the online social network 108 is generated and displayed, during presentation of the content 304, the ACR module 142 in the ACR-enabled connected TV device 141 may be operable to identify, utilizing the ACR, for example by communicating with the ACR system 100, a particular event 703 in the presented content 304. The particular event 703 may occur at a time that may be synchronized to a beginning of the presentation of the outgoing message 702. The exemplary steps may proceed to the end step 804.

In various embodiments of the invention, an ACR module 142 in an ACR-enabled connected TV device 141 may be operable to present, utilizing ACR, for example by communicating with an ACR system 100, an overlay 301 starting at a time that is synchronized to an identified event 303 in presented content 304. The overlay 304 may comprise one or more messages 302 associated with an online social network 108. In instances when the ACR-enabled connected TV device 141 is paired with or associated with a paired device 143 utilizing a companion application 144 downloaded in and running on the paired device 143, the overlay 301 may also be presented on the paired device 143. In this regard, the presented content 304 may comprise, for example, a program, a movie, a game or a commercial associated with a network provided by a network provider such as the network provider 102.

In an exemplary embodiment of the invention, the one or more messages 302 may be pre-generated and prerecorded, before presentation of the content 304, for presentation, during the presentation of the content 304, at a time that is synchronized to the identified event 303.

In instances when the one or more messages 302 are being presented, the ACR module 142 in the ACR-enabled connected TV device 141 may be operable to present, utilizing the ACR, for example one or more additional messages 402 associated with the online social network 108 in the presented overlay 301. The one or more additional messages 402 are generated during the presentation of the content 304.

In an exemplary embodiment of the invention, the one or more messages 502 may be generated, for example, during broadcast or streaming of a program 504 or a movie. The presented content, which comprises the program 504 or the movie, may be presented during a time-delayed playback such as, for example, a DVR playback.

In an exemplary embodiment of the invention, the presented content may comprise, for example, a program 604 or a movie and the one or more messages 602 may be generated by a person 608 associated with the program 604 or the movie. In such instances, the ACR module 142 in the ACR-enabled connected TV device 141 may be operable to present, utilizing the ACR, another overlay 605 during presentation of an identified advertisement 607 in a commercial break. The another overlay 605 may comprise one or more other messages 606 associated with the online social network 108, and the one or more other messages 606 may also be generated by the same person 608.

In an exemplary embodiment of the invention, the ACR module 142 in the ACR-enabled connected TV device 141 may be operable to track, utilizing the ACR, how each of the presented one or more messages 302 is actually being viewed and/or interacted with.

In another exemplary embodiment of the invention, when an outgoing message 702 associated with the online social network 108 is generated and displayed during presentation of the content 304, the ACR module 142 in the ACR-enabled connected TV device 141 may be operable to identify, utilizing the ACR, a particular event 703 in the presented content 304. The particular event 703 may occur at a time synchronized to a beginning of the presentation of the outgoing message 702.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for synchronization of messages to content utilizing automatic content recognition.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in an automatic content recognition (ACR) enabled (ACR-enabled) connected TV device, wherein:
said ACR-enabled connected TV device comprises an ACR module that communicates with an ACR system that is external to said ACR-enabled connected TV device, and said ACR system supports different video fingerprint technologies from multiple vendors;
said ACR module providing fingerprints to said ACR system for matching;
said ACR module receiving information and/or content from said ACR system based on said matching;
said ACR system assigns same interactive event identifiers to different sets of video and audio fingerprints that are generated by said different video and audio fingerprint technologies from said multiple vendors based on timing of said assignment of said interactive event identifiers; and
said interactive event identifiers are utilized in said ACR-enabled connected TV device to trigger events:
presenting, utilizing ACR, an overlay starting at a time synchronized to an identified event in presented content, wherein said presented overlay comprises one or more messages associated with an online social network.

2. The method according to claim 1, wherein said one or more messages are:
pre-generated and prerecorded prior to said content being presented; and
presented, during said presentation of said content, at a time that is synchronized to said identified event.

3. The method according to claim 1, comprising:
when said one or more messages are being presented, presenting, utilizing said ACR, one or more additional messages associated with said online social network in said presented overlay, wherein said one or more additional messages are generated during said presentation of said content.

4. The method according to claim 1, wherein:
said one or more messages are generated during broadcast or streaming of a program or a movie; and said presented content, which comprises said program or said movie, is presented during a time-delayed playback.

5. The method according to claim 1, wherein:
said presented content comprises a program or a movie; and
said one or more messages are generated by a person associated with said program or said movie.

6. The method according to claim 5, comprising presenting, utilizing said ACR, another overlay during presentation of an identified advertisement in a commercial break, wherein:
said another overlay comprises one or more other messages associated with said online social network; and
said one or more other messages are also generated by said person.

7. The method according to claim 1, wherein said presented content comprises a program, a movie, a game or a commercial associated with a network.

8. The method according to claim 1, wherein, when said ACR-enabled connected TV device is paired with a paired device utilizing a companion application running on said paired device, said overlay is also presented on said paired device.

9. The method according to claim 1, comprising tracking, utilizing said ACR, how each of said presented one or more messages is actually being viewed and/or interacted with.

10. The method according to claim 1, comprising:
when an outgoing message associated with said online social network is generated and displayed during presentation of said content, identifying, utilizing said ACR, a particular event in said presented content, wherein said particular event occurs at a time synchronized to a beginning of presentation of said outgoing message.

11. A system, comprising:
an automatic content recognition (ACR) enabled (ACR-enabled) connected TV device, wherein:
said ACR-enabled connected TV device comprises an ACR module that communicates with an ACR system that is external to said ACR-enabled connected TV device, and said ACR system supports different video fingerprint technologies from multiple vendors;
said ACR module providing fingerprints to said ACR system for matching;
said ACR module receiving information and/or content from said ACR system based on said matching;
said ACR system assigns same interactive event identifiers to different sets of video and audio fingerprints that are generated by said different video and audio fingerprint technologies from said multiple vendors based on timing of said assignment of said interactive event identifiers; and
said interactive event identifiers are utilized in said ACR-enabled connected TV device to trigger events, said ACR-enabled connected TV device being operable to:
present, utilizing ACR, an overlay starting at a time synchronized to an identified event in presented content, wherein said presented overlay comprises one or more messages associated with an online social network.

12. The system according to claim 11, wherein said one or more messages are:
pre-generated and prerecorded prior to said content being presented; and
presented, during said presentation of said content, at a time that is synchronized to said identified event.

13. The system according to claim 11, wherein, when said one or more messages are being presented, said ACR-enabled connected TV device is operable to:
present, utilizing said ACR, one or more additional messages associated with said online social network in said presented overlay, and said one or more additional messages are generated during said presentation of said content.

14. The system according to claim 11, wherein:
said one or more messages are generated during broadcast or streaming of a program or a movie; and
said presented content, which comprises said program or said movie, is presented during a time-delayed playback.

15. The system according to claim 11, wherein:
said presented content comprises a program or a movie; and
said one or more messages are generated by a person associated with said program or said movie.

16. The system according to claim 15, wherein:
said ACR-enabled connected TV device is operable to present, utilizing said ACR, another overlay during presentation of an identified advertisement in a commercial break, wherein:
said another overlay comprises one or more other messages associated with said online social network; and
said one or more other messages are also generated by said person.

17. The system according to claim 11, wherein said presented content comprises a program, a movie, a game or a commercial associated with a network.

18. The system according to claim 11, wherein, when said ACR-enabled connected TV device is paired with a paired device utilizing a companion application running on said paired device, said overlay is also presented on said paired device.

19. The system according to claim 11, wherein:
said ACR-enabled connected TV device is operable to track, utilizing said ACR, how each of said presented one or more messages is actually being viewed and/or interacted with; and
when an outgoing message associated with said online social network is generated and displayed during presentation of said content, said ACR-enabled connected TV device is operable to identify, utilizing said ACR, a particular event in said presented content, and said particular event occurs at a time synchronized to a beginning of presentation of said outgoing message.

20. A system, comprising:
an automatic content recognition (ACR) enabled (ACR-enabled) connected TV device, wherein:
said ACR-enabled connected TV device comprises an ACR module that communicates with an ACR system that is external to said ACR-enabled connected TV device, and said ACR system comprises an abstraction layer that supports different video fingerprint technologies from multiple vendors;
said ACR module providing fingerprints to said ACR system for matching;
said ACR module receiving information and/or content from said ACR system based on said matching;
said abstraction layer enables said ACR system to assign same interactive event identifiers to different sets of video and audio fingerprints that are generated by said different video and audio fingerprint technologies from said multiple vendors based on timing of said assignment of said interactive event identifiers; and said interactive event identifiers are utilized in said ACR-enabled connected TV device to trigger events, said ACR-enabled connected TV device being operable to:

present, utilizing ACR, an overlay starting at a time synchronized to an identified event in presented content, wherein said presented overlay comprises one or more messages associated with an online social network.

\* \* \* \* \*